United States Patent
Ishizeki

(10) Patent No.: US 7,607,411 B2
(45) Date of Patent: Oct. 27, 2009

(54) VEHICULAR POWER SUPPLY APPARATUS

(75) Inventor: Seiichi Ishizeki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/169,045

(22) Filed: Jul. 8, 2008

(65) Prior Publication Data
US 2009/0014220 A1 Jan. 15, 2009

(30) Foreign Application Priority Data
Jul. 9, 2007 (JP) ............................. 2007-180187

(51) Int. Cl.
*F02N 17/00* (2006.01)
*G01R 31/08* (2006.01)
(52) U.S. Cl. .................. 123/179.3; 123/179.4; 324/519
(58) Field of Classification Search ............. 123/179.3, 123/179.4; 324/519
See application file for complete search history.

(56) References Cited

U.S. PATENT DOCUMENTS

| | | | | |
|---|---|---|---|---|
| 5,936,409 A | * | 8/1999 | Nishioka | 324/548 |
| 6,285,164 B1 | * | 9/2001 | Noda et al. | 320/132 |
| 6,837,230 B2 | * | 1/2005 | Nobe et al. | 123/644 |
| 7,432,616 B2 | * | 10/2008 | Hatai et al. | 307/66 |
| 2007/0087231 A1 | * | 4/2007 | Pearson | 429/9 |

FOREIGN PATENT DOCUMENTS

| JP | 2000278802 A | * | 10/2000 |
|---|---|---|---|
| JP | 2003-224902 A | | 8/2003 |

* cited by examiner

*Primary Examiner*—Stephen K Cronin
*Assistant Examiner*—David Hamaoui
(74) *Attorney, Agent, or Firm*—Darby & Darby P.C.

(57) ABSTRACT

A vehicular power supply apparatus includes a capacitor, an idling stop means for stopping an engine at a halt of the vehicle and restarting the engine at driver's preset driving operation by supplying current to an engine starter with the capacitor, a current detecting means for detecting the current, a cumulative value calculating means for calculating cumulative value of the current on the basis of the detected current after starting of the engine starter until a set time elapses, and an abnormality determining means for determining, when engine revolution speed at the time the set time has elapsed is outside a preset range and the cumulative value is equal to or less than a preset value, that the capacitor is abnormal.

3 Claims, 3 Drawing Sheets

VEHICULAR POWER SUPPLY APPARATUS

CROSS-REFERENCES TO RELATED APPLICATIONS

The disclosure of Japanese Patent Application No. 2007-180187 filed on Jul. 9, 2007 including the specification, drawings and abstract is incorporated herein by reference in its entirety.

BACKGROUND OF THE INVENTION

1. Field of the Invention

The present invention relates to a vehicular power supply apparatus in which a capacitor is used, and which is applied to a vehicle having an idling stop function that automatically stops an engine when the vehicle is at a halt.

2. Description of the Related Art

In recent years, many vehicles having idling stop functions have been put to practical use. With the idling stop functions, when the vehicles stop at intersections or the like, their engines are automatically stopped, and their engines are restarted in conjunction with drivers' preset driving operations. In order to improve engine startability, it is common that a power supply of a vehicle having an idling stop function of the above type has a configuration in which both a battery, such as a lead-acid battery, and a capacitor, such as a lithium ion capacitor or an electric double layer capacitor, are used to supply a large current to an engine starter.

Accordingly, to maintain good engine startability, it is essential to maintain capacitor performance. For example, Japanese Unexamined Patent Application Publication No. 2003-224902 discloses, as a technology for performing a capacitor abnormality diagnosis, a technology in which changes in current and voltage for a capacitor are measured, and, when the capacitance or internal resistance of the capacitor calculated on the basis of the measured values are outside an allowable range, it is determined that the capacitor is abnormal.

In the technology disclosed in Japanese Unexamined Patent Application Publication No. 2003-224902, it is necessary to provide each capacitor with a dedicated voltage sensor or the like, so that there is a possibility of structural complexity.

SUMMARY OF THE INVENTION

The present invention has been made in view of the above-described circumstances. It is an object of the present invention to provide a vehicular power supply apparatus that uses a simplified configuration to easily perform a capacitor abnormality diagnosis.

According to a first aspect of the present invention, the vehicular power supply apparatus includes a capacitor; an idling stop means for stopping an engine at a halt of the vehicle and restarting the engine at a driver's preset driving operation by supplying a current to an engine starter with the capacitor; a current detecting means for detecting the current; a cumulative value calculating means for calculating a cumulative value of the current on the basis of the detected current after starting of the engine starter until a set time elapses; and an abnormality determining means for determining, when an engine revolution speed at the time the set time has elapsed is outside a preset range and the cumulative value is equal to or less than a preset value, that the capacitor is abnormal.

According to a second aspect of the present invention, in a case where the engine is in a state before being warmed-up when the engine starter is started, the abnormality determining means does not determine whether or not the capacitor is abnormal.

According to a third aspect of the present invention, the vehicular power apparatus further includes a battery, wherein the idling stop means supplies the current to the engine starter with both the capacitor and the battery when the engine is restarted.

According to the vehicular power supply apparatus, with a simplified configuration, a capacitor abnormality diagnosis can be easily performed.

DESCRIPTION OF THE PREFERRED EMBODIMENTS

Figure 1:
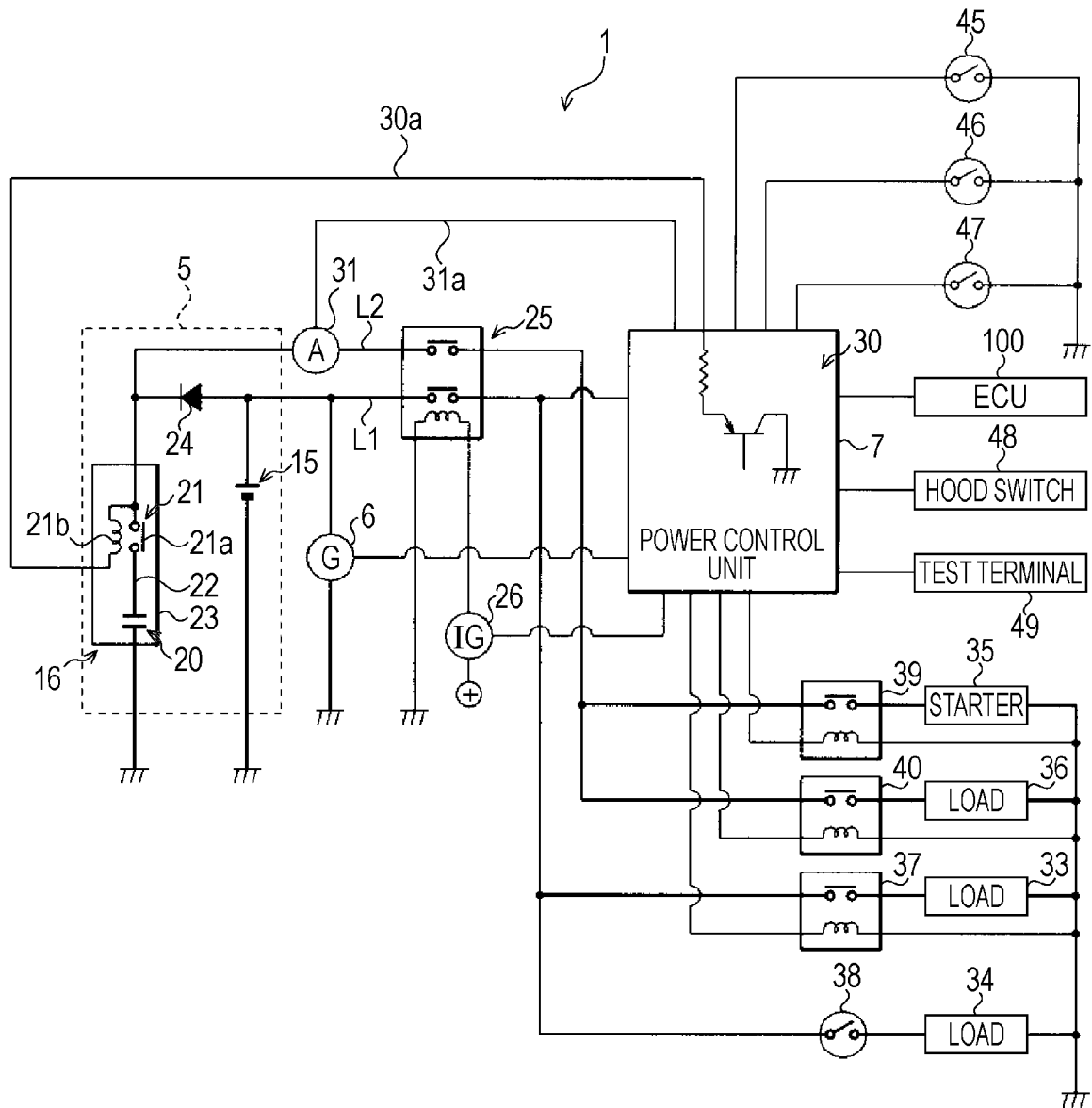
FIG. 1 is a schematic circuit diagram showing a vehicular power supply apparatus.
Figure 2:
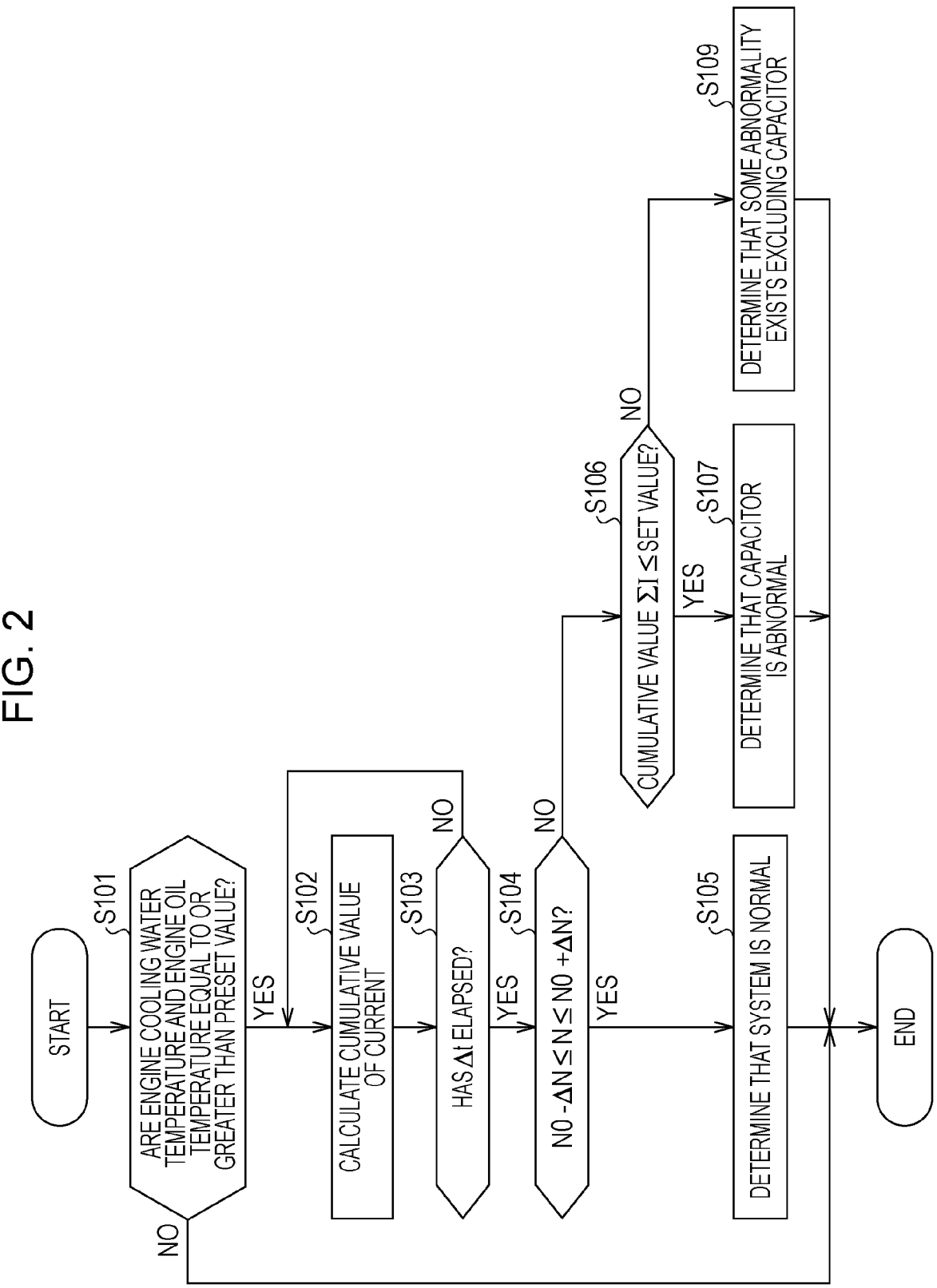
FIG. 2 is a flowchart showing a capacitor diagnosing routine.
Figure 3:
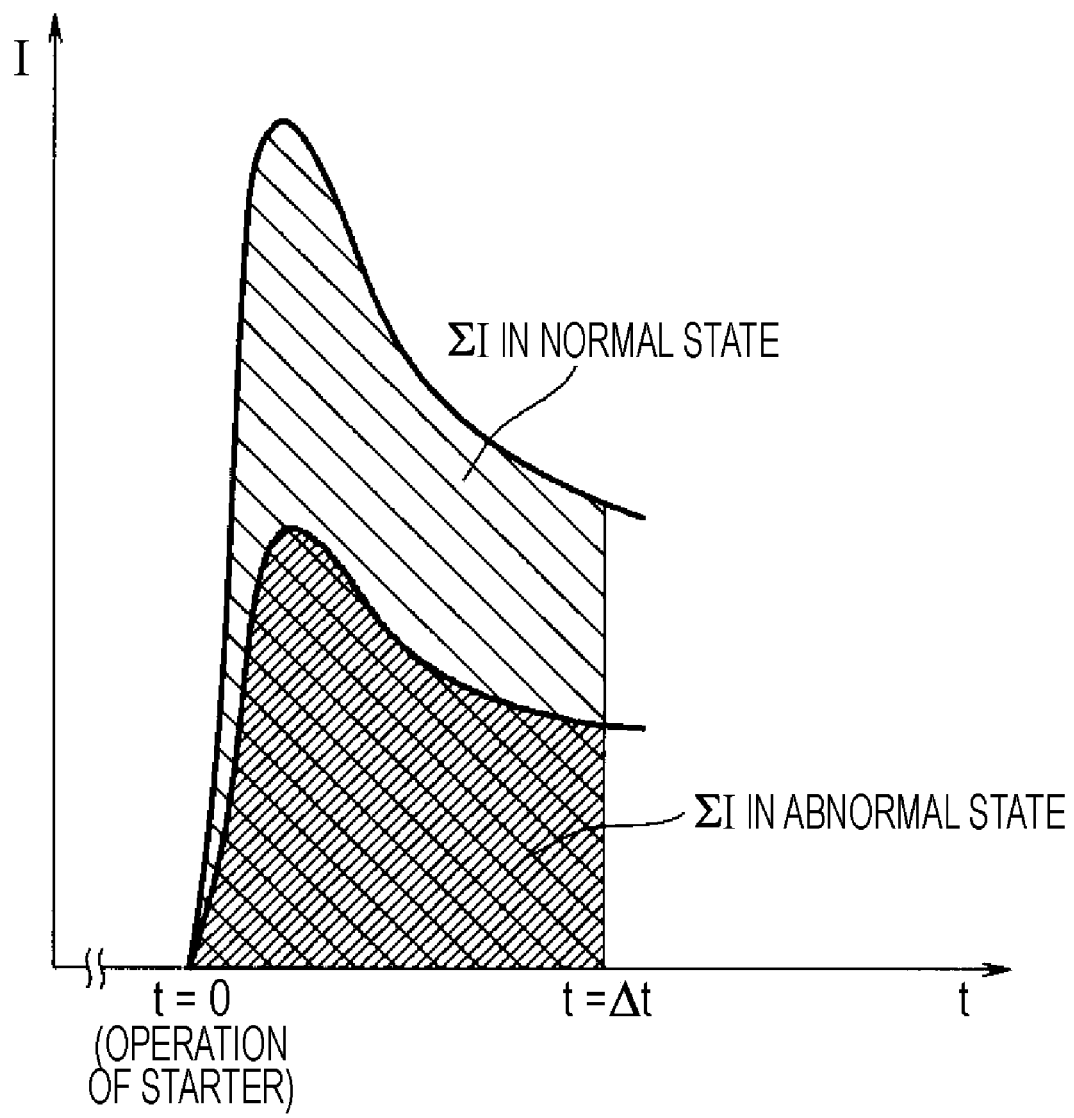
FIG. 3 is a graph illustrating changes in current supplied to a starter when an engine is started.

An embodiment of the present invention will be described below. The accompanying drawings relates to an embodiment of the present invention. FIG. 1 is a schematic circuit diagram showing a vehicular power supply apparatus. FIG. 2 is a flowchart showing a capacitor diagnosing routine. FIG. 3 is a graph illustrating a change in current supplied to a starter when an engine is started.

The vehicular power supply apparatus 1 shown in FIG. 1 is preferably installed in a vehicle having an idling stop function that automatically stops an engine when a vehicle is stopped and that restarts the engine in conjunction with a preset driver's driving operation (such as a brake pedal releasing operation or a gas pedal depressing operation). The vehicular power supply apparatus 1 has a main unit including a power section 5 capable of generating an instantaneous large current, an alternator 6 that performs power generation by using a driving force of the engine, and a power control unit 7 that performs power feeding control, etc., of the power section 5 and the alternator 6.

In the power section 5, for example, a 12-V battery 15 formed by a lead-acid battery or the like, and a capacitor device 16 are connected in parallel to form a main portion.

In the capacitor device 16, for example, a large-capacitance capacitor 20 formed by an electric double layer capacitor, a lithium capacitor, or the like, and an internal relay 21 provided on an electric wire 22 of the capacitor 20 are accommodated in a housing 23 to form a main portion.

The internal relay 21 is formed by, for example, a mechanical normally open relay in which a contact 21a is opened (off) when an excitation coil 21b is in a non-conduction state. The contact 21a of the internal relay 21 is provided on the electric wire 22 on a side (hereinafter referred to as an "anode side") in which the capacitor 20 is electrically connected to an anode of the battery 15. One end of the excitation coil 21b is electrically connected to the electric wire 22 closer to the anode than the contact 21a, while the other end is electrically connected to a switching element 30 in the power control unit 7 via a signal line 30a. This allows the excitation coil 21b to close (turn on) the contact 21a by conduction from the battery 15 when the switching element 30 is controlled to be on. As described above, the internal relay 21 is formed by a normally open relay that can be closed by power directly supplied from the battery 15.

In this embodiment, the power section 5 includes a diode 24 between the capacitor device 16 and the battery 15. The diode 24 inhibits power feeding from the capacitor device 16 to the battery 15. A first power supply wire L1 capable of outputting a current (e.g., a maximum current of 500 A) from the battery 15 is electrically connected to the anode of the diode 24. A second power supply wire L2 capable of outputting a large current (e.g., a maximum current of 1200 A) from the battery 15 and the capacitor 20 is electrically connected to the cathode of the diode 24.

The power control unit 7 is electrically connected as an electric load that does not need a large current to the first power supply wire L1, and an electric load 33 such as a headlight is electrically connected to the first power supply wire L1 via a relay 37. In addition, an electric load 34 such as an electronic side mirror is electrically connected to the first power supply wire L1 via a switch 38.

In addition, an electric load (engine starter) 35 that needs an instantaneous large current when the engine is started is electrically connected to the second power supply wire L2, and an electric load 36 such as a seat heater or a rear window defogger is electrically connected to the second power supply wire L2 via a relay 40.

An ignition relay 25 is provided in the middle of the first and second power supply wires L1 and L2. The alternator 6 is electrically connected to the first power supply wire L1 closer to the power section 5 than the ignition relay 25. In addition, a current sensor 31 as current detecting means is provided on the second power supply wire L2. The current sensor 31 outputs, to the power control unit 7, an information signal representing a current I flowing through the second power supply wire L2.

When an ignition switch 26 is turned on, the ignition relay 25 is excited to electrically connect the side of the power section 5 and the alternator 6 and each electric load. The excitation of the ignition relay 25 is configured to continue until the ignition switch 26 is turned off. In addition, information that indicates that the ignition switch 26 has been turned on, that is, a key inserted into the ignition switch 26 is at an on-position, is output from the ignition switch 26 to the power control unit 7.

When the alternator 6 is driven by the engine to initiate power generation, the alternator 6 supplies each electric load with generated power via the first and second power supply wires L1 and L2. In a case where the generated power is larger than the power consumption of each electric load, the alternator 6 charges the battery 15, and charges the capacitor 20 via the diode 24. A regulator control circuit (not shown) of the alternator 6 outputs, to the power control unit 7, an information signal indicating that the engine is being run.

Switches 45 to 47 for operating the electric loads 33, 35, and 36 are connected to the power control unit 7. Here, for example, the switch 45 is a headlight switch corresponding to the electric load 33. The switch 46 is a seat heater switch or rear window defogger switch corresponding to the electric load 36. The switch 47 is an engine start button for operating the electric load (engine starter) 35 or a detection switch that detects whether the key inserted into the ignition switch is at an engine start position.

The power control unit 7 controls operations of the electric loads 33, 35, and 36 in accordance with operation states of the switches 45 to 47. In other words, the power control unit 7 does not excites (controls) the relays 37, 39, and 40 (to be off) in accordance with the switches 45 to 47, which have been turned off, and excites (controls) the relays 37, 39, and 40 (to be on) in accordance with the switches 45 to 47, which have been turned on. The excited relays 37, 39, and 40 electrically connect the power section 5 (and the alternator 6) and the side of the electric loads 33, 35, and 36, and supply power to the electric loads 33, 35, and 36. The power control unit 7 is configured to receive various control signals of the engine from an engine control unit (ECU) 100. When the power control unit 7 receives, from the engine control unit 100, a signal that instructs the engine, which has been automatically stopped by idling stop control, to restart, the power control unit 7 controls the relay 39 to be on, and operates the electric load 35 (engine starter) until it is determined that the engine has successfully performed combustion. In this embodiment, even if the switch 46 has been turned on, the power control unit 7 controls the relay 40 to be off while the relay 39 is controlled to be on. The electric load 34 is directly operated by the switch 38.

The power control unit 7 uses the switching element 30 to control switching of the internal relay 21 in the capacitor device 16. In this embodiment, for example, when the relay 39 or 40 is controlled to be on, the power control unit 7 turns on the switching element 30 to control the internal relay 21 to be closed (on). Accordingly, a large current obtained by adding a current from the capacitor 20 to a current from the battery 15 (and the alternator 6) is supplied to the electric load 35 or 36 via the second power supply wire L2. When the power control unit 7 has determined that a charging amount of the capacitor 20 decreases, the power control unit 7 turns on the switching element 30 and controls the internal relay 21 to be closed (on). This charges the capacitor 20.

Here, for example, a hood switch 48 for detecting an open/closed state of an engine hood is connected to the power control unit 7. In a case where the relay 39 or 40 is controlled to be on, or, even if the charging amount of the capacitor 20 decreases, when it is determined that the engine hood is closed, the internal relay 21 is controlled to be opened on the basis of the standpoint of user protection from a large current.

Further, the power control unit 7 diagnoses the capacitor 20 on the basis of the current I on the second power supply wire L2 which is input from the current sensor 31 and engine control information input from the engine control unit 100. In other words, in this embodiment, when the relay 39 is controlled to be on, the power control unit 7 calculates a cumulative value $\Sigma I$ of the current I (the current I supplied to the engine starter 35) detected after the engine starter 35 is started until set time $\Delta t$ elapses. When the engine revolution speed after set time $\Delta t$ has elapsed is outside a preset range, and the cumulative value $\Sigma I$ of the current I is equal to or less than a preset value, the power control unit 7 determines that the capacitor 20 is abnormal. In other words, the power control unit 7 diagnoses the capacitor 20 on the basis of detection of a current in a predetermined range and whether or not the engine revolution speed reaches a predetermined revolution speed within the set time $\Delta t$. As described above, in this embodiment, the power control unit 7 has functions as cumulative value calculating means and abnormality determining means.

Next, a diagnosis of the capacitor 20 that is executed by the power control unit 7 will be described below in accordance with the flowchart of the capacitor diagnosing routine shown in FIG. 2. This routine is executed, for example, whenever the relay 39 is controlled to be on. When the routine starts, first, in step S101, on the basis of whether an engine cooling water temperature and an engine oil temperature are equal to or greater than a preset temperature, the power control unit 7 determines whether or not the engine is in a warm-up completion state.

If, in step S101, one of the engine cooling water temperature and the engine oil temperature does not reach the set temperature, the power control unit 7 determines that the engine is currently in a state before being warmed-up, and that the power control unit 7 is not proper to diagnose the capacitor 20 due to large influence such as reflection. The capacitor 20 directly exits the routine.

Alternatively, if, in step S101, the engine cooling water temperature and the engine oil temperature are equal to or greater than the set temperature, and the engine is in the warm-up completion state, the power control unit 7 proceeds to step S102. In step S102, the power control unit 7 performs calculation (see FIG. 3) of the cumulative value $\Sigma I$ of the current I detected by the current sensor 31. After that, proceeding to step S103, the power control unit 7 determines whether or not the set time $\Delta t$ has elapsed after starting of the engine starter 35. Here, the engine starter 35 is tuned so that, for example, generation of excess torque that affects engine durability is prevented and the engine can be started with a response that does not give uncomfortable feeling to the driver. Under the tuning, the set time $\Delta t$ is set to a time taken to appropriately start the engine. Specifically, the set time $\Delta t$ is set so that, for example, $\Delta t=0.7$ (seconds).

If, in step S103, the set time $\Delta t$ has not elapsed after the starting of the engine, the power control unit 7 returns to step S102.

Alternatively, if, in step S103, the set time $\Delta t$ has elapsed after starting the engine starter 35, the power control unit 7 proceeds to step S104. In step S104, the power control unit 7 determines whether or not the current engine revolution speed N, input as engine control information from the engine control unit 100, is within a preset range ($N0-\Delta N \leq N \leq N0+\Delta N$). In this embodiment, $N0+\Delta N$ is set to the revolution speed that is equal to or less than the revolution speed in a normal idling state, and $N0-\Delta N$ is set to the revolution speed that is slightly greater than the minimum revolution speed (start-limit-revolution speed) at which the engine is regarded as starting. Specifically, for example, when the revolution speed in the normal idling state is set to 600 (rpm), and the start-limit-revolution speed is 300 (rpm), the engine is set so that $N0=350$ (rpm) and $\Delta N=50$ (rpm).

If, in step S104, the revolution speed N is $N0-\Delta N \leq N \leq N0+\Delta N$, the power control unit 7 proceeds to step S105. In step S105, the power control unit 7 determines that an engine start system including the capacitor 20 is normal. After that, the power control unit 7 exits the routine.

Alternatively, if, in step S104, the engine revolution speed N is not $N0-\Delta N \leq N \leq N0+\Delta N$, the power control unit 7 determines that the engine start system has some abnormality, and proceeds to step S106. In step S106, the power control unit 7 determines whether the cumulative value $\Sigma I$ of the current I is equal to or less than a set value.

If, in step S106, the cumulative value $\Sigma I$ of the current I is equal to or less than a set value, the power control unit 7 proceeds to step S107. In step S107, the power control unit 7 determines that the capacitor 20 is abnormal, and exits the routine.

If, in step S106, the cumulative value $\Sigma I$ of the current I is greater than a set value, the power control unit 7 proceeds to step S109. In step S109, the power control unit 7 determines that some abnormality exists excluding the capacitor 20 of the engine start system, and exits the routine.

According to the above embodiment, by performing calculation of the cumulative value $\Sigma I$ of the current I supplied to the engine starter 35 after starting of the engine starter 35 until the set time $\Delta t$ elapses, and determining whether the capacitor 20 is abnormal on the basis of the revolution speed N and the cumulative value $\Sigma I$ of the current I, which are obtained at the time the set $\Delta t$ has elapsed, a simplified configuration easily performs an abnormality diagnosis of the capacitor 20. In other words, instead of focusing attention to the capacitor 20 for a diagnosis, the power control unit 7 diagnoses the capacitor 20 by focusing attention to the entire engine start system of a vehicle having the idling stop function, whereby the need to provide each capacitor with a dedicated voltage sensor is eliminated and a simplified configuration easily performs a capacitor abnormality diagnosis.

In this case, in a case where the engine is in the state before being warmed-up when the engine starter 35 is started, no diagnosis of the capacitor 20 is performed considering an influence such as friction, whereby diagnosis accuracy can be improved by preventing false determination.

Here, in this embodiment, a test terminal 49 is connected to the power control unit 7. The power control unit 7 can start the engine in a test mode on the basis of a control signal input through the test terminal 49. When the power control unit 7 starts the engine in the test mode, the power control unit 7 can perform an abnormality diagnosis of the capacitor 20 in processing substantially similar to the above-described capacitor diagnosing routine. Accordingly, for example, a capacitor diagnosis at an in-factory line end, a capacitor diagnosis at a dealer, or the like, can be realized by a simple on-the-car diagnosis. In addition, at a factory, a dealer, or the like, by inputting an environmental condition or the like through the test terminal 49, a capacitor diagnosis can be performed with high accuracy.

What is claimed is:

1. A vehicular power supply apparatus comprising:
   capacitor;
   idling stop means for stopping an engine at a halt of the vehicle and restarting the engine at a driver's preset driving operation by supplying a current to an engine starter with the capacitor;
   current detecting means for detecting the current;
   cumulative value calculating means for calculating a cumulative value of the current on the basis of the detected current after starting of the engine starter until a set time elapses; and
   abnormality determining means for determining, when an engine revolution speed at the time the set time has elapsed is outside a preset range and the cumulative value is equal to or less than a preset value, that the capacitor is abnormal.

2. The vehicular power supply apparatus according to claim 1, wherein, in a case where the engine is in a state before being warmed-up when the engine starter is started, the abnormality determining means does not determine whether or not the capacitor is abnormal.

3. The vehicular power supply apparatus according to claim 1, further comprising a battery, wherein the idling stop means supplies the current to the engine starter with both the capacitor and the battery when the engine is restarted.

* * * * *